May 25, 1937. R. O. STOCKIL Re. 20,384

FOLDING CHAIR

Original Filed April 14, 1931 2 Sheets-Sheet 1

Inventor

R. O. Stockil

By Watson E. Coleman

Attorney

May 25, 1937. R. O. STOCKIL Re. 20,384
FOLDING CHAIR
Original Filed April 14, 1931 2 Sheets-Sheet 2
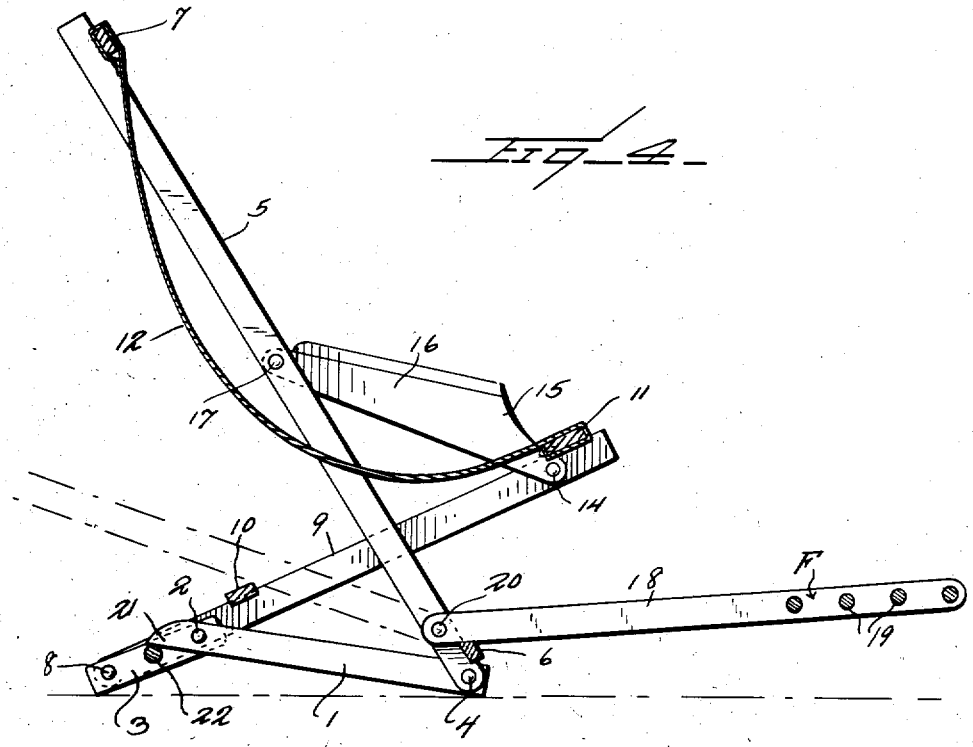
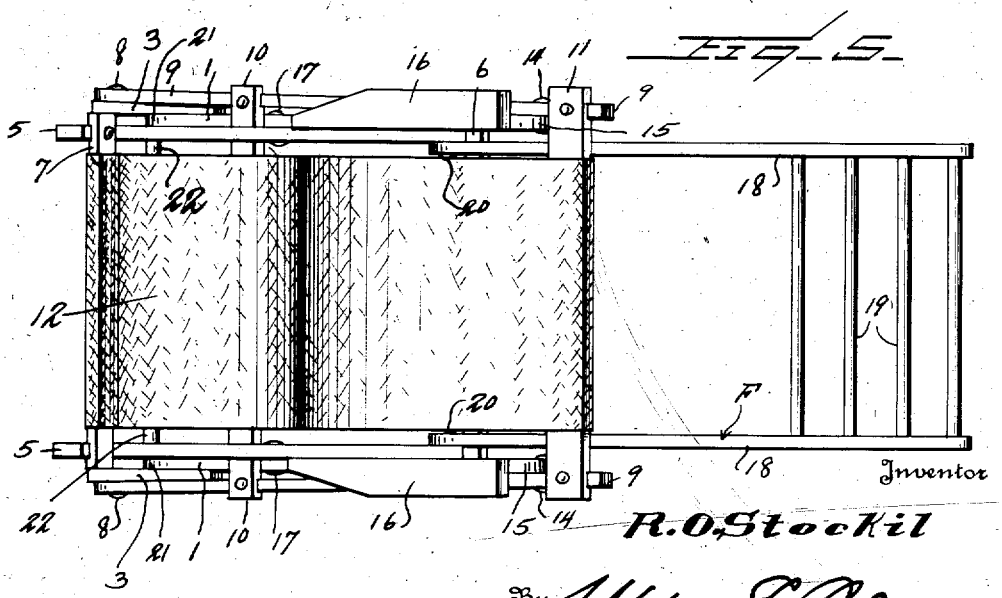
Inventor
R. O. Stockil
By Watson E. Coleman
Attorney Reissued May 25, 1937

Re. 20,384

UNITED STATES PATENT OFFICE 20,384

FOLDING CHAIR

Raymond O. Stockil, Ladysmith, Natal, Union of South Africa

Original No. 1,986,381, dated January 1, 1935, Serial No. 530,057, April 14, 1931. Renewed July 3, 1934. Application for reissue May 21, 1936, Serial No. 81,135

7 Claims. (Cl. 155—56)

This invention relates to folding chairs and has relation more particularly to an article of furniture of this kind which is commonly used upon porches and lawns, and it is an object of the invention to provide a chair of this character of an oscillating or rocking type and which is constructed and assembled in a manner to eliminate creeping of the chair during the period of such oscillation or rocking.

The invention also has for an object to provide a device of this kind comprising an arrangement and assembly of parts assuring an easy and convenient folding of the chair when not in use and whereby the chair when folded may be caused to occupy the least possible space.

Another object of the invention is to provide a chair of this kind constructed in a manner whereby is substantially eliminated any tendency of the chair to mar a lawn or other surface upon which it may be rested, and wherein the chair is constructed to readily compensate itself to any inequalities with which it may contact when placed upon a lawn or other desired supporting surface.

An additional object of the invention is to provide a chair of this kind embodying a foot rest which moves in harmony with the rocking or oscillating movement of the chair and which foot rest is so constructed and assembled as to be readily positioned rearwardly of the chair proper when desired.

A still further object of the invention is to provide a chair of this kind including arm rests and which arm rests provide means for limiting the rocking or swinging movement of the chair in one direction.

The invention consists in the details of construction and in the combination and arrangement of the several parts of my improved folding chair whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 4 is a vertical sectional view taken through the structure as illustrated in Figure 1;

Figure 5 is a view in top plan of the chair as illustrated in Figure 1.

Figure 1:
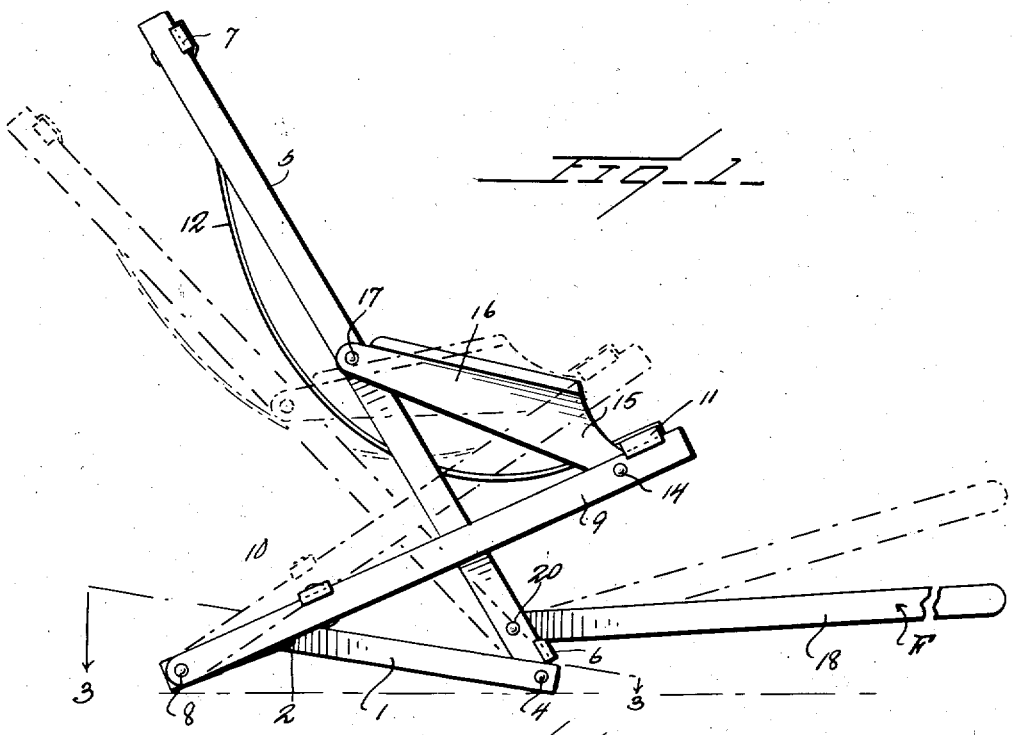
Figure 1 is a view in side elevation of a chair constructed in accordance with an embodiment of my invention, a second position of certain parts of the chair being indicated by broken lines.

As disclosed in the accompanying drawings, my improved chair is provided at each side with an elongated base member or sill 1 having pivotally connected, as at 2, to its rear portion a relatively short supplemental base member or sill 3. The base member or sill 1 and the supplemental base member or sill 3 have relative swinging movement to facilitate the desired folding of the chair in its entirety and also to readily compensate for any inequality which may be encountered upon the surface on which the chair is resting.

The forward end portion of each of the base members or sills 1 has pivotally connected thereto, as at 4, an end portion of an elongated side supporting leg 5 herein disclosed as straight from end to end. The pivoted end portions of the side legs 5 are connected one to the other by the transversely disposed cross bar 6 while the opposite or outer end portions of said side legs 5 are connected by the outer or top cross bar 7.

Pivotally connected, as at 8, to the outer end portion of each of the supplemental base members or sills 3 is an end portion of a second side leg 9 of a length materially less than the length of the adjacent side leg 5 and which leg 5, when the chair is extended for use as illustrated in Figures 1 and 4, is inclined upwardly and forwardly and terminates in advance of said adjacent leg 5 which is disposed on an upward and rearward incline. The adjacent legs 5 and 9 are readily movable one independently of the other to facilitate the desired folding or extending of the chair. The legs 9 at points relatively close to their pivots 8 are connected by a cross bar 10.

The outer or free end portions of the legs 9 are connected by a cross bar 11 to which is suitably secured an end portion of a flexible seat and back element 12, the opposite end portion of which being suitably secured to the bar 7 connecting the outer or top portions of the legs 5. At a point inwardly of but in relatively close proximity to the connecting bar 11, each of the legs 9 has pivotally connected thereto, as at 14, an extended end portion 15 of an arm rest 16. The opposite end portion of this arm rest 16 is pivotally connected, as at 17, to a supporting leg 5 at a desired point intermediate its ends.

When the chair is extended for use, the arm rests 16 operate to maintain the side legs 5 and 9 in desired relative assembly yet at the same time readily permit the occupant of the chair to rock or oscillate the same, thus obtaining all of the comforts and advantages of a conventional rocking chair. At this time it is to be particularly stated that upon the occupant of the chair as herein disclosed rocking or oscillating the same, or more particularly the legs 5 and 9, no creeping occurs of the base members or sills 1 and the supplemental base members or sills 3 but, on the contrary, the chair maintains a fixed placement which is of especial importance as it eliminates the liability of marring the lawn or other surface upon which the chair may be rested.

In connection with my chair I find it of advantage to employ a foot rest F comprising the elongated parallel side bars 18 having their outer end portions connected by the cross rods 19.

The inner end portion of each of the side bars 18 of the foot rest F is pivotally connected, as at 20, to the pivoted end portion of a side leg 5 closely adjacent to but outwardly of the cross bar 6 so that when the foot rest F is extended for use, said side bar 18 will contact with the connecting bar 6 and thus provide an effective support for the extended foot rest to maintain the same at all times free of the surface upon which the chair is resting and also to allow the foot rest to swing or oscillate in harmony with the chair. The frame F, when extended for use, also serves effectively as a lever to facilitate the desired rocking of the chair by the occupant. It is also to be particularly noted at this time that as the side legs 5 and 9 are being rocked or oscillated, the forward swinging movement thereof will be limited by contact of the bar 11 connecting the side legs 9 contacting from above with each of the front extensions 15 of the arm rests 16. It is also to be noted that when the foot rest F is extended the cross bars 19 are arranged a material distance in advance of the connecting bar 11 so that upon a person seating himself upon the chair he can do so without hindrance being offered by the extended foot rest.

If desired, the foot rest may be swung back of the seat element 12 and out of the way. This may be readily done by pulling up on the cross member 11 around the pivotal connection 17 of each of the arm rests 16 until each of the supplemental base members or sills 3 is substantially vertically disposed. In this position the foot rest F may be readily swung rearwardly to the position indicated by broken lines in Figure 4 or forwardly as illustrated by full lines in both Figures 1 and 4. This rearward movement of the foot rest F is limited by contact of the side bars 18 with the cross bar 10 connecting the legs 9.

Figure 2:
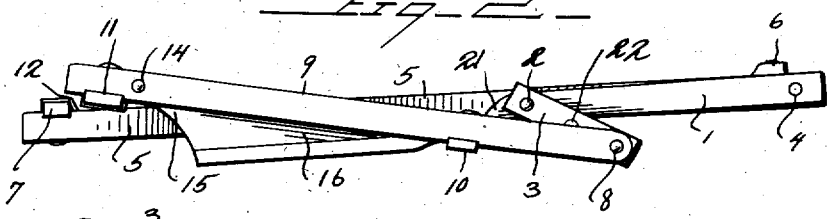
Figure 2 is a view in side elevation of the chair as herein embodied folded.

When it is desired to fold the chair so that the same may be compacted to occupy a minimum of space when not in use, the same may be readily effected by the relative swinging movement of the different parts as permitted by the various pivotal connections. When so folded, as particularly illustrated in Figure 2, each of the supplemental base members or sills 3 swings inwardly of its associated base member or sill 1, and each base member or sill 1 swings into a position substantially in parallelism with the adjacent side leg 5 with each side leg 9 folding in a manner to bring the cross bar 11 into close proximity to the cross bar 7. The foot rest F when the chair is folded is substantially housed or confined between the legs 5.

Figure 3:
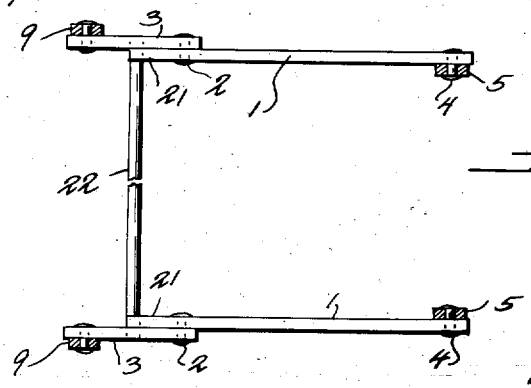
Figure 3 is a sectional view taken substantially on the line 3—3 of Figure 1 looking in the direction of the arrow.

As is particularly illustrated in Figures 3 and 4, the extremity of each of the base members or sills 1 is provided with a tail extension 21 directed rearwardly from the adjacent pivotal connection 2 and which extension 21, when the chair is extended for use as illustrated in Figures 1 and 4, has contact from above with a stop herein disclosed as a cross bar or rod 22 connecting the supplemental base members or sills 3. The contact of the tail extensions 21 with the cross member 22 occurs when the chair is extended for use and thus prevents the pivotal connections from passing down below the horizontal, thus assuring an easy folding of the chair when not in use and at the same time increasing the compactness of the chair when folded. This cross member or rod 22 is positioned between the pivotal connections 2 and 8 and such member or rod connects the supplemental base members or sills for unitary swinging movement in the same direction about their pivots 8.

It is this particular action of the members or sills 3 as assured by the cross member or rod 22 which causes the effective folding or compacting of the chair.

The cross member or rod 22 also serves to keep the front members or sills 1, when the chair is extended for use, from having turning or twisting movement and also assures the chair structure in its entirety when extended for use being maintained steady. In this connection it is to be stated that the under surfaces of the tail pieces 21 of the base members or sills 1 constitute flat surfaces which have direct contact with the cross member or rod 22, thus assuring the substantial elimination of any tendency of the members or sills 1 from turning or twisting.

This application is partly in continuation of my application Serial No. 493,382 filed November 4, 1930.

From the foregoing description it is thought to be obvious that a folding chair constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A folding chair of the character described comprising a pair of spaced base members, supplemental base members pivotally connected to the first base members, side legs pivotally connected to the outer ends of the first base members, additional side legs pivotally connected with the outer end portions of the supplemental base members, one set of legs being of a length less than the other, a cross member connecting the outer end portions of each set of supporting legs, a flexible back and seat element supported by the members connecting the supporting legs, and arm rests pivotally connecting each supporting leg of one set with an adjacent supporting leg of the second set, said arm rests each having a part for contact with the member connecting one set of supporting legs for limiting the oscillating movement of the supporting legs in one direction.

2. A folding chair comprising a pair of base members, side legs pivotally connected to the forward end portions of the base members, additional side legs pivotally connected with the rear end portions of the base members, a flexible seat structure supported by both sets of legs, members pivotally connected with the free end portions of the additional set of legs and the first named set of legs, a stop carried by the first named side legs and positioned adjacent to the pivotal connections between said legs and the base members, and a foot rest pivotally connected to said first named legs at a point in relatively close proximity to the base members but above the stop, said foot rest when extended engaging the stop from above to allow the foot rest to move with the first named legs, said foot rest serving as a lever to facilitate the rocking movement of the chair.

3. A folding chair of the character described comprising a pair of spaced base members, side legs connected to the forward end portions of the base members and extending upwardly and rearwardly when the chair is in use, additional side legs pivotally connected with the rear end portions of the base members and extending upwardly and forwardly when the chair is in use, a seat structure operatively supported by both sets of legs, an arm rest pivotally connecting each supporting leg of one set with an adjacent supporting leg of the second set, a foot rest pivotally connected with the lower portions of the first named legs, and means carried by the first named legs for supporting the foot rest when extended free for movement with said legs, said means also allowing the foot rest when extended to serve as a lever to facilitate rocking of the chair.

4. A folding chair comprising a pair of base members, a set of supporting legs pivotally connected with the forward portions of the base members, a second set of supporting legs pivotally connected with the rear portions of the base members, the legs of one set being in crossed relation with the legs of the second set when the chair is extended with the legs of the first set upwardly and rearwardly directed and the legs of the second set upwardly and forwardly disposed, a seat operatively supported by both sets of legs, a member pivotally connected with a leg of one set and with an adjacent leg of the second set, a foot rest pivotally connected with the lower portions of the first named set of legs at a point below the seat and closely adjacent to the pivotal connections of said legs of the first named set and the base members, and means carried by said legs of the first named set with which the foot rest freely engages from above when extended to hold said foot rest free for movement with said legs, said means also allowing said extended foot rest to serve as a lever to facilitate rocking of the chair.

5. A folding chair comprising a pair of base members, side legs pivotally connected to the forward end portions of the base members, additional side legs pivotally connected with the rear end portions of the base members, a flexible seat structure supported by both sets of legs, members pivotally connected with the free end portions of the additional set of legs and the first named set of legs, a stop carried by the first named side legs and positioned adjacent to the pivotal connections between said legs and the base members, and a foot rest pivotally connected to said first named legs at a point in relatively close proximity to the base members, said foot rest when extended engaging the stop to allow the foot rest to move with the first named legs, said foot rest serving as a lever to facilitate the rocking movement of the chair.

6. A folding chair of the character described comprising a pair of spaced base members, side legs connected to the forward end portions of the base members and extending upwardly and rearwardly when the chair is in use, additional side legs pivotally connected with the rear end portions of the base members and extending upwardly and forwardly when the chair is in use, a seat structure operatively supported by both sets of legs, an arm rest pivotally connecting each supporting leg of one set with an adjacent supporting leg of the second set, a foot rest pivotally connected with the lower portions of the first named legs, and means carried by the first named legs for holding the foot rest when extended free for movement with said legs, said means also allowing the foot rest when extended to serve as a lever to facilitate rocking of the chair.

7. A folding chair comprising a pair of base members, a set of supporting legs pivotally connected with the forward portions of the base members, a second set of supporting legs pivotally connected with the rear portions of the base members, the legs of one set being in crossed relation with the legs of the second set when the chair is extended with the legs of the first set upwardly and rearwardly directed and the legs of the second set upwardly and forwardly disposed, a seat operatively supported by both sets of legs, a member pivotally connected with a leg of one set and with an adjacent leg of the second set, a foot rest pivotally connected with the lower portions of the first named set of legs at a point below the seat and closely adjacent to the pivotal connections of said legs of the first named set and the base members, and means carried by said legs of the first named set with which the foot rest freely engages when extended to hold said foot rest free for movement with said legs, said means also allowing said extended foot rest to serve as a lever to facilitate rocking of the chair.

R. O. STOCKIL.